United States Patent
Park

(10) Patent No.: US 9,269,328 B2
(45) Date of Patent: Feb. 23, 2016

(54) EFFICIENT FRAME RENDERING

(71) Applicant: Google Inc., Mountain View, CA (US)

(72) Inventor: Keun Young Park, Santa Clara, CA (US)

(73) Assignee: GOOGLE INC., Mountain View, CA (US)

(*) Notice: Subject to any disclaimer, the term of this patent is extended or adjusted under 35 U.S.C. 154(b) by 36 days.

(21) Appl. No.: 14/313,287

(22) Filed: Jun. 24, 2014

(65) Prior Publication Data

US 2015/0371604 A1    Dec. 24, 2015

(51) Int. Cl.
  *G06F 3/041*    (2006.01)
  *G09G 5/00*    (2006.01)
  *G06T 1/20*    (2006.01)

(52) U.S. Cl.
  CPC    *G09G 5/006* (2013.01); *G06T 1/20* (2013.01); *G09G 5/005* (2013.01); *G09G 2354/00* (2013.01); *G09G 2360/127* (2013.01); *G09G 2370/06* (2013.01); *G09G 2380/10* (2013.01)

(58) Field of Classification Search
  CPC ........ G06F 3/0488; G06T 1/20; G09G 5/005; G09G 2354/00; G09G 2360/127; G09G 2380/10
  See application file for complete search history.

(56) References Cited

U.S. PATENT DOCUMENTS

| | | | | |
|---|---|---|---|---|
| 7,990,402 B2 * | 8/2011 | Yamamoto | ........... | G09G 3/3406 345/102 |
| 8,384,829 B2 * | 2/2013 | Yamashita | ........... | G09G 3/3233 348/649 |
| 2002/0028061 A1 | 3/2002 | Takeuchi et al. | | |
| 2004/0066363 A1 * | 4/2004 | Yamano | ............... | G09G 3/3625 345/98 |
| 2004/0246917 A1 * | 12/2004 | Cheng | .................. | H04W 36/02 370/328 |
| 2006/0135165 A1 * | 6/2006 | Faccin | ................. | H04W 36/02 455/436 |
| 2006/0192766 A1 * | 8/2006 | Nakamura | .............. | G06F 3/421 345/173 |
| 2008/0022350 A1 * | 1/2008 | Hostyn | ............. | H04L 29/06027 725/139 |
| 2008/0052408 A1 * | 2/2008 | Saito | ...................... | H04N 5/783 709/239 |
| 2010/0064228 A1 * | 3/2010 | Tsern | .................... | G06F 3/1415 715/740 |
| 2011/0230178 A1 * | 9/2011 | Jones | .................. | H04M 1/0235 455/422.1 |
| 2013/0159893 A1 * | 6/2013 | Lewin | .................... | G06F 9/4443 715/762 |
| 2013/0208992 A1 * | 8/2013 | Lin | ......................... | G06T 9/004 382/236 |
| 2013/0214995 A1 * | 8/2013 | Lewin | .................... | G06F 3/1446 345/1.3 |
| 2013/0222210 A1 | 8/2013 | Wang et al. | | |
| 2013/0223538 A1 * | 8/2013 | Wang | ................. | H04N 21/4307 375/240.25 |

OTHER PUBLICATIONS

"PCT/US2015/036795", International Search Report and Written Opinion issued in PCT/US2015/036795 on Sep. 2, 2015, 10.

* cited by examiner

*Primary Examiner* — Joe H Cheng
(74) *Attorney, Agent, or Firm* — Morris & Kamlay LLP

(57) ABSTRACT

A user may interact with an interactive remote display (e.g., touch input) and the interaction may be sent to an application on a mobile device. The mobile device (application and/or encoder) may render frames for the display when there is a change. Latency in the pipeline may be alleviated by determine a rendering rate for an application. A dummy frame may be sent to the encoder if the application is not a constant rendering type of application. The dummy frames may be sent subsequent to the rendered frames to flush the pipeline.

14 Claims, 5 Drawing Sheets

EFFICIENT FRAME RENDERING

BACKGROUND

In a streaming video system, video frames may be rendered by an encoder. The encoder, for example, may compress the video stream and/or encode the video stream in a format and/or resolution that is compatible with the display on which it is to be shown. The connection between the device rendering the video and the display may be a wired (e.g., USB) or wireless (e.g., WiFi, Bluetooth) connection. A decoder associated with the display may decode the encoded video frames it receives. When video is rendered at a constant frame rate, the display may be continuously updated with new frames.

BRIEF SUMMARY

According to an implementation, a mobile device may receive an indication of a touch input on a remote display. The remote display may be separate from the mobile device and the touch input may be associated with a change to an application being shown on the display. The mobile device may determine a rendering rate for the application. An encoder of the mobile device may be sent at least one dummy response based on the rendering rate. One or more frames may be rendered including the at least one dummy frame. The rendering may fill a pipeline of the encoder. The one or more frames comprising the filled pipeline may be sent to a decoder that is coupled to the display.

A system is disclosed that includes a processor connected to a mobile device. The processor may be configured to receive an indication of a touch input on a remote display. The remote display may be separate from the mobile device and the touch input may be associated with a change to an application being shown on the display. The processor may be configured to determine a rendering rate for the application. The processor may send at least one dummy frame to an encoder of the mobile device based on the rendering rate. The processor may render one or more frames including the at least one dummy frame. The rendering may fill a pipeline of the encoder. The processor may be configured to send the frames that make up the filled pipeline to a decoder that is coupled to the display.

A process is disclosed in an implementation in which at least one frame is generated in response to an input received from an infotainment system. A rendering rate may be determined to be non-constant. At least one dummy frame and the at least one frame may be sent to an encoder. The encoder may render the at least one dummy frame and the at least one frame to form one or more rendered frames. The one or more rendered frames may be sent to a decoder connected to the infotainment system. The infotainment system may display the one or more rendered frames.

In an implementation, a system according to the presently disclosed subject matter includes a means for generating one or more frames in response to an input received from an infotainment system. It may include a means for determining that a rendering rate is not constant. The system may include a means for sending one or more dummy frames and the one or more frames to an encoder. The system may include an encoder means for rendering the one or more dummy frames and the one or more frames to form rendered frames. The system may include a means for sending the rendered frames to a decoder connected to the infotainment system. The infotainment system may include a means for displaying the rendered frames.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

A user may interact with a display in a variety of ways such as by touch, pressing a key, or turning a dial. A video encoder for user interaction may have difficulty in efficiently rendering the video on the display in response to the user's input (e.g., touch). A typical video encoder operates as a pipeline that requires several frames to form an encoded frame. This can be challenging in cases where the display is only periodically updated. If video is rendered at a constant rate, such as 30 frames per second ("FPS"), then the screen may be constantly refreshed. If the device driving the display is sufficiently powerful, it may drive the display at a constant rate without difficulty. However, if the device is less powerful, such as a mobile device, it may be advantageous to render a frame for the display only when there it is necessary to show a change on the display. For example, when a user touches the display, the application with which the user is interacting via the display may update only a small portion of the display. The encoder may render one or two frames, for example, and send it to a decoder connected to the display.

Figure 1:
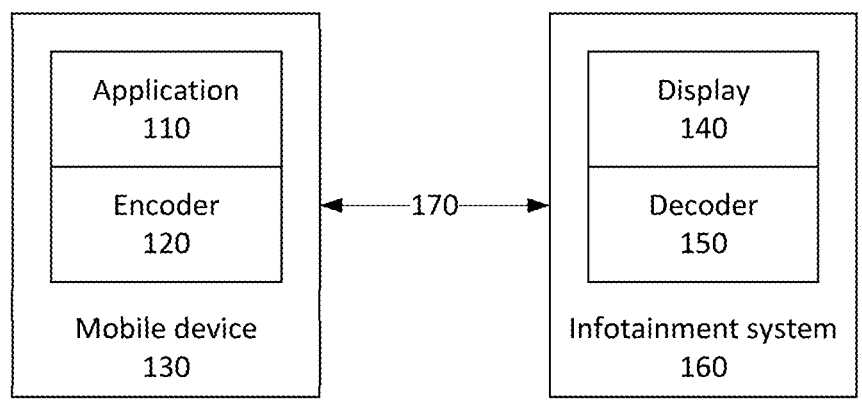
FIG. 1 shows an example system in which a mobile device is utilized to drive the display of an infotainment system as disclosed herein.

FIG. 1 is an example system in which a mobile device 130 is utilized to drive the display 140 of an infotainment system 160. This may be referred to as a projected architecture. The mobile device 130 may receive an indication of the infotainment system's layout with respect to a display resolution, an aspect ratio, one or more buttons, and one or more dials. Other functionality of the infotainment system 160 such as a radio or the vehicle's temperature control may likewise be controlled by the mobile device 130 in a projected architecture system. The mobile device 130 may be connected to the vehicle 170 (or other remote system) using a USB cable or other wired or wireless connection. The encoder 120 for the mobile device 130 may utilize a pipeline that has two or more stages due to power constraints. A three-stage pipeline, for example, may wait to send encoded frames until it has three frames to send. Thus, the display 140 of the infotainment system 160 may not show any change unless and until the encoder 120 receives three frames to render from the application 110 or elsewhere. If there is only one user interface update (e.g., one frame being rendered), then the display 140 may improperly fail to reflect a change due to the user interaction because the encoder 120 is waiting to send the rendered frame that shows the change until it has two more frames to fill the three-stage pipeline. Once the pipeline is full, the rendered video frames may be sent to a decoder 150 connected to the infotainment system 160.

As disclosed herein, the encoder (e.g., mobile device) may determine if a dummy frame is required based on the rendering rate of the one or more application operating on the mobile device that are being shown on an infotainment display. A dummy frame may refer to a short, simple frame indicator that instructs the system to show the preceding frame, for example. Because the dummy frame is small, it helps the compressed video stream to remain small and/or more readily transmitted. The dummy frame may assist in pushing the pipeline in cases where an application is not a constant rendering application. For example, if an application is showing a movie and it is rendered at 30 FPS, then a dummy frame may not be useful. However, if the application is updating a user interface component, then it may be rendering one or a few frames periodically rather than continuously. This may be reflected as a pipeline latency issue and can be remedied, as disclosed herein, by sending a one or more dummy frames to fill the unfilled stages of a pipeline to clear the pipeline for the next set of rendered frames to be sent to the display of an infotainment system and/or a decoder connected thereto.

The determination of whether or not a dummy frame is necessary may be based on the rendering rate. The rendering rate may be determined in several ways. The system may note the throughput of the encoder over period of time and, based on the throughput, assign a rate of rendering by the encoder. The application directing the encoder may provide an indication of the rendering rate. For example, a movie rendering application may provide an indication that it is a constant rendering application and does not require a dummy frame. Similarly, the type of user input received may provide an indication of the amount of rendering that may be necessary to respond to the user's input. For example, if a user is drawing a shape on a display, the system may wait to send a dummy frame to the encoder in anticipation of the user's additional input. Thus, the decision to send a dummy frame can be based on a pattern of rendering, a type of input, and a type of application.

Figure 2:
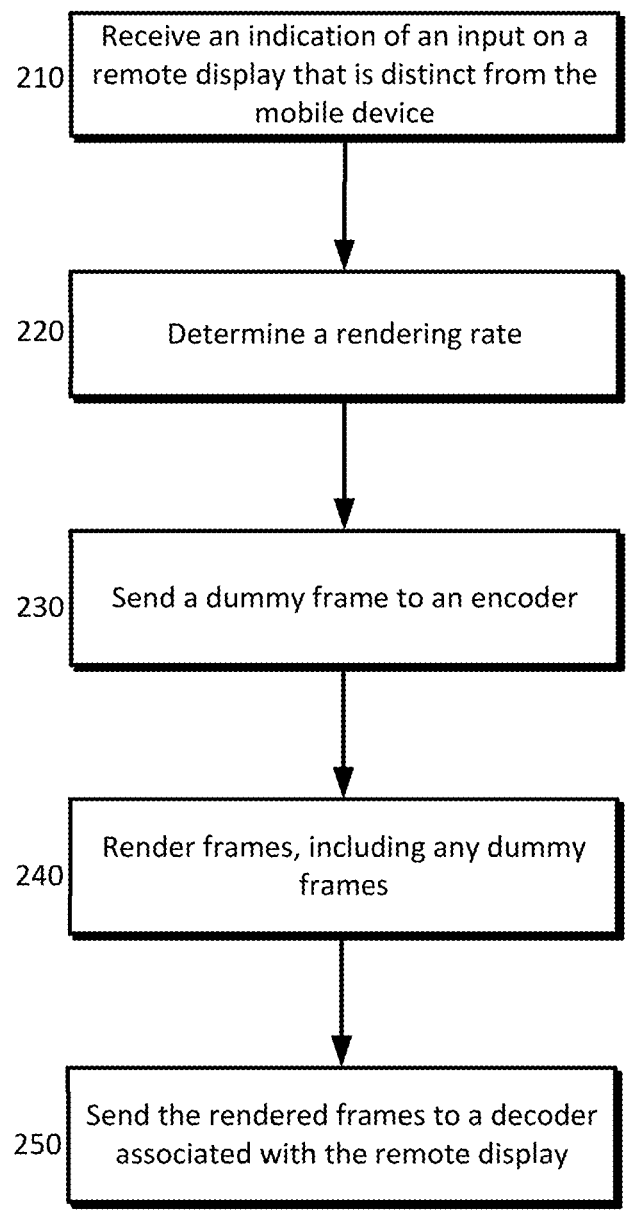
FIG. 2 is an example process for rendering video frames on a remote display as disclosed herein.

A process is disclosed for rendering video frames on a remote display, as shown in the example in FIG. 2. A mobile device may receive an indication of an input on a remote display at 210. The remote display may be a component of an infotainment system that is integrated into a vehicle. The input may be a touch input, for example, on the remote display. The mobile device may drive the remote display. For example, a navigation application may operate on the mobile device and be shown on the remote display in addition to or instead of the mobile device's display. A user may have selected a soft button on the remote display. The location of the touch input may be sent to the mobile device. The application may determine that the location of the touch input corresponds to the soft button and it may be associated with a feature that requires an update to the remote display.

The mobile device may determine the rendering rate for the application at 220. As described above, the rendering rate may be determined based on the application, the type of input, and a pattern of rendering. The application may be a constant rendering rate, in which case, the mobile device may render the appropriate frames for the remote display in response to the input received therefrom. If the rendering rate is determined to be periodic or otherwise non-constant, the mobile device may send one or more dummy frames to an encoder at 230. In some cases, the mobile device may be preconfigured with a threshold rendering rate below which the mobile device may send dummy frames and above which it may not send any dummy frames. The dummy frames may be generated and may be a computational code that indicates to the display that it should utilize the preceding frame or the succeeding frame.

As described earlier, the pipeline may include one or more stages corresponding to a single frame. One or more frames, including any dummy frames, may be rendered by the encoder at 240. A sufficient number of dummy frames may be provided such that the pipeline is filled, causing the mobile device to transmit the rendered frames from the encoder to a decoder that is coupled to the display at 250. Once the frames in the pipeline are transmitted, the mobile device may clear the pipeline and the encoder may again wait to fill the pipeline with frames. The number of dummy frames provided may be correlated with the rendering rate. If the mobile device is updating a portion of the display, it may determine that it must provide a sufficient number of frames to fill the pipeline.

Figure 3:
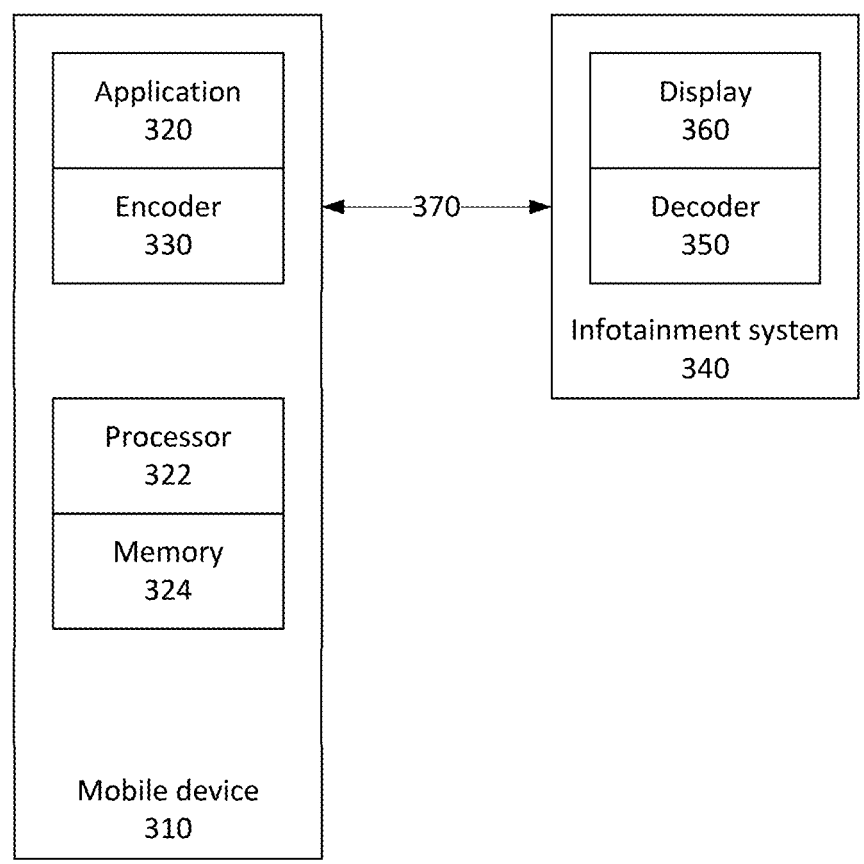
FIG. 3 is an example process for rendering video frames on a remote display as disclosed herein.

FIG. 3 shows an example of a system that may include one or more of a mobile device 310 and a remote display 360 of, for example, a motor vehicle infotainment system 340. The mobile device 310 may have its own display, a processor 322, a compute readable memory 324. The mobile device 310 may operate one or more applications 320 simultaneously. Each of the applications 320 may be associated with a rendering rate or a type of application. For example, an application 320 may indicate to the processor what its rendering rate upon request. The application 320 may a movie type of application that is associated with a constant rendering rate. The mobile device 310 may have an encoder 330 that is configured to render one or more frames at the direction of the processor 322. The encoder 330, for example, may adjust the resolution, the format, and compression of the frames it renders. The encoder 330 may be responsible for generating one or more dummy frames. For example, it may generate a frame that includes computer readable code directing the decoder of a remote display to utilize a preceding frame.

The processor 322 may be configured to receive an indication of an input from a remote display 360 of an infotainment system 340. The input may be provided utilizing a touch if the remote display 360 is a touchscreen, and/or a button or knob that is connected to the infotainment system 340. The input may be sent to the mobile device 310 by a wired or wireless connection 370. An application 320 operating on the mobile device 310 may determine whether the input requires an update to the remote display 360. If an update is required to a portion or all of the remote display 360, the mobile device 310 may determine a rendering rate for the application 320. As described above, more than one application 320 may be simultaneously utilized on the mobile device 310. The processor 322 may, therefore, determine the rendering rate based on the encoder's 330 activity instead of a single application 320. As another example, it may determine the sum rendering rate for all applications currently operating on the mobile device 310. The processor 322 may send at least one dummy frame to the encoder 330 based on the rendering rate. As stated above, the encoder 330 may be responsible for generating the dummy frame in some configurations. Video frames may be rendered that include at least one dummy frame such that the pipeline of the encoder is completely filled. The encoder 330 may then transmit the rendered frames to a decoder 350 that is coupled to the remote display 360.

Figure 4:
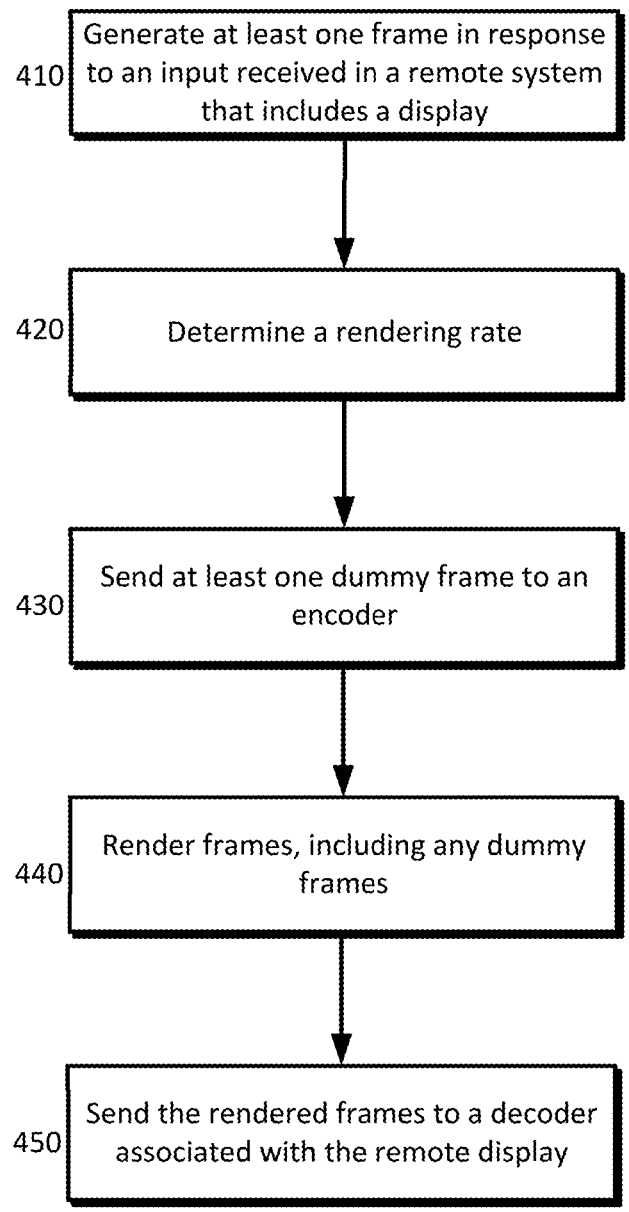
FIG. 4 is an example process for generating one or more dummy frames to be rendered by an encoder and sent to a decoder coupled to an infotainment system as disclosed herein.

In an implementation, an example of which is provided in FIG. 4, at least one frame may be generated in response to an input received from an infotainment system at 410 as described above. The frame may correspond to an update of a portion of the user interface shown on a remote display that is coupled to the infotainment system. The rendering rate for the update may be below a constant rate (e.g., 30 FPS) or a threshold level (e.g., under 1 FPS). The mobile device may determine the rendering rate at 420 as described earlier. One or more dummy frames may be incorporated into the pipeline of an encoder. A dummy frame may be generated and/or inserted into the pipeline by the encoder itself. In some configurations, a dummy frame may be generated by the mobile device and sent to the encoder at 430. The encoder may render any dummy frames and video frames associated with the update of the remote display at 440. The rendering process may involve inserting the frames into the pipeline in the proper order, compressing the video stream, formatting the video stream (e.g., the video frames that make up the stream), adjusting the resolution of the video frames, etc. The rendered frames may be sent to a decoder connected to the infotainment system at 450. The decoder may adapt the video frames for presentation on the remote display of the infotainment system.

Implementations are described above in the context of a projected architecture system that includes a mobile device driving the display of content on and user interaction with an infotainment system. However, the implementations disclosed herein may be compatible with other configurations. For example, a first mobile device may drive the display of content on a second mobile device. The second mobile device may interact with the content shown on its display via the first mobile device. As an example, the first mobile device may host a video game and provide updates to the video game's action on the second mobile device's display as well as the first mobile device's display.

Figure 5:
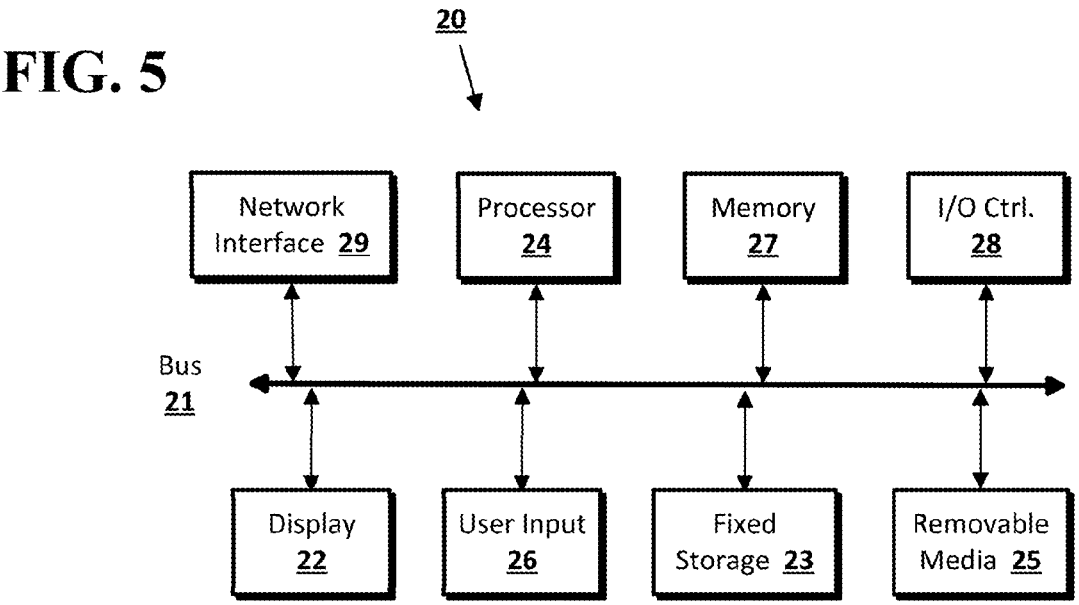
FIG. 5 shows a computer according to an implementation of the disclosed subject matter.

Implementations of the presently disclosed subject matter may be implemented in and used with a variety of component and network architectures. FIG. 5 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
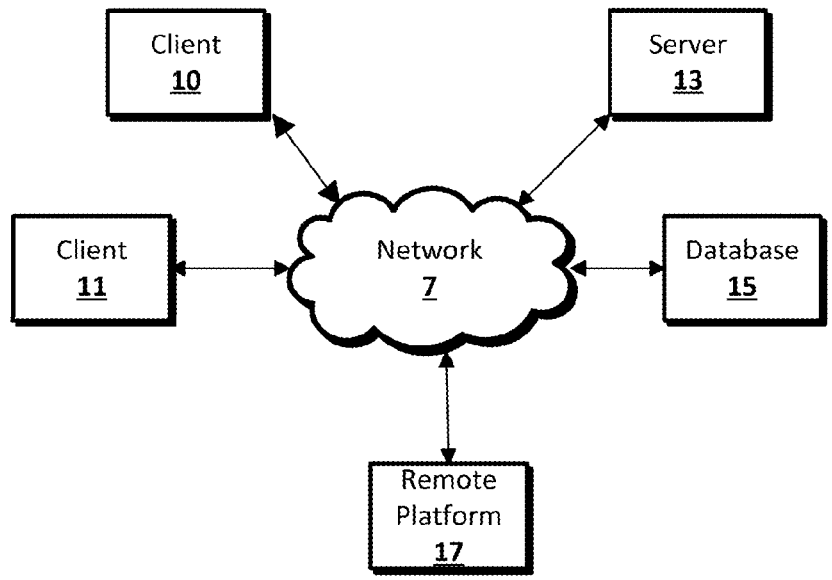
FIG. 6 shows a network configuration according to an implementation of the disclosed subject matter.

FIG. 6 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's provided input, a user's geographic location, and any other similar data associated with a user), or to control whether and/or how to receive data from a provider that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by systems disclosed herein.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
    receiving, by a mobile device, an indication of a touch input on a remote display, wherein the remote display is separate from the mobile device and the touch input is associated with a change to an application being shown on the remote display;
    determining, by the mobile device, a rendering rate for the application;
    sending, to an encoder of the mobile device, at least one dummy frame based on the rendering rate;
    rendering a plurality of frames including the at least one dummy frame, wherein the plurality of rendered frames fills a pipeline of the encoder; and
    sending the plurality of rendered frames of the filled pipeline to a decoder that is coupled to the remote display.

2. The method of claim 1, further comprising determining that the rendering rate is below a threshold level.

3. The method of claim 1, further comprising updating a portion of the remote display in response to the touch input.

4. The method of claim 1, wherein the plurality of rendered frames and the at least one dummy frame alters at least a portion of the remote display.

5. The method of claim 1, wherein the remote display is a component of an infotainment system incorporated in a motor vehicle.

6. The method of claim 1, wherein the decoder is coupled to the remote display.

7. A system, comprising:
    a processor connected to a mobile device, wherein the processor is configured to:
        receive an indication of a touch input on a remote display, wherein the remote display is separate from the mobile device and the touch input is associated with a change to an application being shown on the remote display;
        determine a rendering rate for the application;
        send, to an encoder of the mobile device, at least one dummy frame based on the rendering rate;
        render a plurality of frames including the at least one dummy frame, wherein the plurality of rendered frames fills a pipeline of the encoder; and
        send the plurality of rendered frames of the filled pipeline to a decoder that is coupled to the remote display.

8. The system of claim 7, the processor further configured to determine that the rendering rate is below a threshold level.

9. The system of claim 7, the processor further configured to update a portion of the remote display in response to the touch input.

10. The system of claim 7, wherein the plurality of rendered frames and the at least one dummy frame alters at least a portion of the remote display.

11. The system of claim 7, wherein the remote display is a component of an infotainment system incorporated in a motor vehicle.

12. The system of claim 7, wherein the decoder is coupled to the remote display.

13. A computer-implemented method, comprising:
    generating at least one frame in response to an input received from an infotainment system;
    determining that a rendering rate is not constant;
    sending at least one dummy frame and the at least one frame to an encoder;
    rendering, by the encoder, the at least one dummy frame and the at least one frame to form a plurality of rendered frames; and
    sending the plurality of rendered frames to a decoder connected to the infotainment system, wherein the infotainment system displays the plurality of rendered frames.

14. The method of claim 13, wherein the plurality of rendered frames are received by a decoder of the infotainment system.

* * * * *